US005513696A

United States Patent [19]
Baer

[11] Patent Number: 5,513,696
[45] Date of Patent: May 7, 1996

[54] PASSIVE TEMPERATURE REGULATING SYSTEM FOR A BUILDING

[75] Inventor: Stephen C. Baer, Albuquerque, N.M.

[73] Assignee: Zomeworks Corporation, Albuquerque, N.M.

[21] Appl. No.: 400,914

[22] Filed: Mar. 8, 1995

[51] Int. Cl.⁶ .................................. G05D 23/00
[52] U.S. Cl. .................. 165/32; 165/10; 165/40; 165/49; 165/902; 126/622; 126/635
[58] Field of Search ............... 165/911, 904, 165/902, 131, 104.26, 104.14, 83, 82, 56, 49, 48.1, 32, 10, 2, 40; 432/225; 52/39, 27; 248/224.3; 126/637, 636, 635, 622, 621

[56] References Cited

U.S. PATENT DOCUMENTS

| | | | |
|---|---|---|---|
| 3,985,182 | 10/1976 | Hara et al. | 165/32 |
| 4,267,825 | 5/1981 | Ward | 126/636 |
| 4,290,416 | 9/1981 | Maloney | 165/902 X |
| 4,331,128 | 5/1982 | Gebhardt | 165/104.26 X |
| 4,356,811 | 11/1982 | de Grijs et al. | 126/635 |
| 4,627,487 | 12/1986 | Basiulis | 165/104.14 X |
| 4,738,247 | 4/1988 | Moore | 126/622 |
| 4,750,473 | 7/1988 | Dunn | 126/622 X |
| 4,941,526 | 7/1990 | Nilsson | 165/32 |
| 5,070,933 | 12/1991 | Baer | 165/904 X |
| 5,195,575 | 3/1993 | Wylie | 165/32 |

FOREIGN PATENT DOCUMENTS 1726962  4/1992  U.S.S.R. ............ 165/104.14

*Primary Examiner*—John Rivell
*Assistant Examiner*—Christopher Atkinson
*Attorney, Agent, or Firm*—Townsend and Townsend and Crew

[57] ABSTRACT

A passive temperature regulating system (2) for heating and cooling a structure (8) exposed to extreme temperatures. The system comprises a thermally conductive exterior wall, such as a roof (6), having corrugations (16) formed therein. A plurality of plastic containers (4) each have a body portion (30) filled with liquid, such as water, and an elongated heat exchanger portion (28) attached to the exterior wall within one of the corrugations. The heat exchanger portion has a conduit in communication with the body via two tubes (44, 46) so that the water can flow vertically between the heat exchanger portion and the body. When the containers are attached to the exterior wall, the water in the heat exchanger portion exchanges heat with the ambient environment through the exterior wall and the water in the body modifies the temperature of the interior of the structure. In one embodiment, the containers have flexible bellows (60) and are attached to the exterior sidewalls (64) of the structure for either heating or cooling the interior of the structure.

22 Claims, 4 Drawing Sheets

PASSIVE TEMPERATURE REGULATING SYSTEM FOR A BUILDING

FIELD OF THE INVENTION

This invention relates to passive temperature regulating systems generally, and more specifically to a heat exchange system for passively heating and/or cooling the interior of a structure exposed to varying temperatures and containing heat producing equipment, people or animals.

BACKGROUND OF THE INVENTION

The interior spaces of structures exposed to extreme heat and cold are typically heated and cooled by active systems, such as furnaces and air conditioners. Unfortunately, such temperature regulating systems demand a substantial amount of electric or other type of external power which generates large operating costs in addition to the initial cost of the system. Of course, the cost of active temperature regulating systems is not always prohibitive in structures designed for human habitation or use, such as homes, office buildings, factories and the like. However, temperature regulating systems are often desirable in other types of structures where the installation and operating costs of active systems cannot be justified, such as relatively small or remote structures designed to house livestock or electrical or fiber-optic equipment. It is often not feasible to bring electricity to a remote structure or to provide for the generation of electricity on-site, or to provide an alternative source of power. As a result, active systems often cannot be used in situations in which some form of temperature control is highly desirable.

In an attempt to solve some of the above problems, passive cooling systems have been developed to provide cooling by passively radiating heat to the night air and sky. One such system is disclosed in commonly assigned U.S. Pat. No. 5,070,933 to Baer, the complete disclosure of which is incorporated herein by reference. In this cooling system, a plurality of plastic containers filled with water and insulation are mounted to the roof of the structure. The insulation contains vertical passages so that the water may flow between the top and bottom of the container. During the evening, relatively cold water, chilled by the night air and sky radiation, flows downwardly through the vertical passages in the insulation to the body of the container and cools the interior of the structure by heat transfer. During the day, the flow of water ceases, and insulation and standing water minimize the penetration of heat from the outside.

One problem with existing passive cooling systems such as the above referenced patent is that the plastic containers filled with water and insulation are heavy. Therefore, these systems typically include a large and relatively expensive support system to hold the plastic containers against the roof of the structure. In addition, gravity and thermal stresses eventually cause the heavy plastic containers to sag away from the roof of the structure. This decreases the heat transfer from the water to the cool night air and night sky because the plastic containers are no longer in intimate contact with the roof.

The above problems with supporting plastic containers against a roof have been addressed by another passive cooling system disclosed in commonly assigned U.S. patent application Ser. No. 08/277,925 to Harrison, the complete disclosure of which is incorporated herein by reference. In this system, plastic containers are integrally formed to the roof of the structure by melting plastic in a lower mold portion removably attached to an upper wall section (i.e., a portion of the roof). After cooling, the lower mold portion is removed and the cooled plastic forms a container which is an integral part of the upper wall section or roof. Although the containers in this cooling system generally remain in contact with the roof during use, they are typically expensive to manufacture. This is because the containers must be rotationally molded so that they will be integral with the surface of the upper wall or roof section.

Other passive cooling systems have been disclosed in U.S. Pat. Nos. 3,563,305 and 4,089,916 to Hay and U.S. Pat. No. 4,615,381 to Malloney. The Hay patents generally describe systems having water containers or ponds horizontally disposed atop the enclosure in direct thermal exchange with the underlying space by thermosiphon action. Malloney discloses a system comprising tanks of water that are integrally attached to the roof of the structure. These systems, however, are limited because they are an integral, permanent part of the structure's outer wall or roof. Therefore, the entire outer wall or roof must be specially designed to incorporate the cooling system. In addition, since these prior art systems are integral with the outer walls or roof, they generally cannot be removed without also removing (and possibly destroying) the roof or outer walls of the structure.

SUMMARY OF THE INVENTION

The present invention is directed to a passive temperature regulating system for heating and/or cooling the interior of a structure producing heat and being exposed to varying temperatures. The system comprises a thermally conductive element that forms part of the structure's exterior wall or roof and has a plurality of corrugations facing outward towards the ambient environment. The system further includes a plurality of plastic containers each having a body portion and a heat exchanger portion extending from the body portion and attached to the thermally conductive element within one of the corrugations. The heat exchanger portion has an inner conduit in fluid communication with the body portion at each end of the conduit for allowing liquid, such as water, to flow in a vertical direction between the two portions of the container by thermosiphon action. When the containers are attached to the exterior wall or roof, the water in the heat exchanger portion of each container exchanges heat with the ambient environment through the thermally conductive element and the water in each body portion modifies the temperature of the interior of the structure.

One advantage of the system is that the thermally conductive elements and plastic containers can be formed with relatively inexpensive, conventional manufacturing processes. In a preferred configuration, the thermally conductive elements comprise a number of metal sections that have been roll formed or extruded so that the corrugations are directly formed into each section. The metal sections are then linked together at their ends to form the exterior wall or roof of the structure (i.e., as metal buildings are typically fabricated). The plastic containers are conventionally blow molded so that the heat exchanger portions fit precisely within the corrugations of the wall sections. Using a large number of small blow-molded bottles provides a relatively large surface area for heat transfer between the heat producing equipment, people or animals within the structure and the water in the body portion of the container.

Another advantage of this system is that the invention uses only a slight variation of conventional corrugated roof or wall panels, i.e., the metal is slightly thicker and the corrugations are slightly deeper than traditional metal building construction to accomodate the heavy, water filled containers. Therefore, buildings that utilize the passive cooling system of the present invention will generally conform to the design and appearance of conventional buildings. In addition, a building designer is able to fashion a wide range of inexpensive passive temperature regulating systems from the inside of the structure. Thus, the system can be adjusted (e.g., to vary the amount of passive heating and/or cooling of the interior of the structure) or completely removed from the structure by simply inserting and withdrawing plastic containers from the roof or wall panels.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENT

Figure 1:
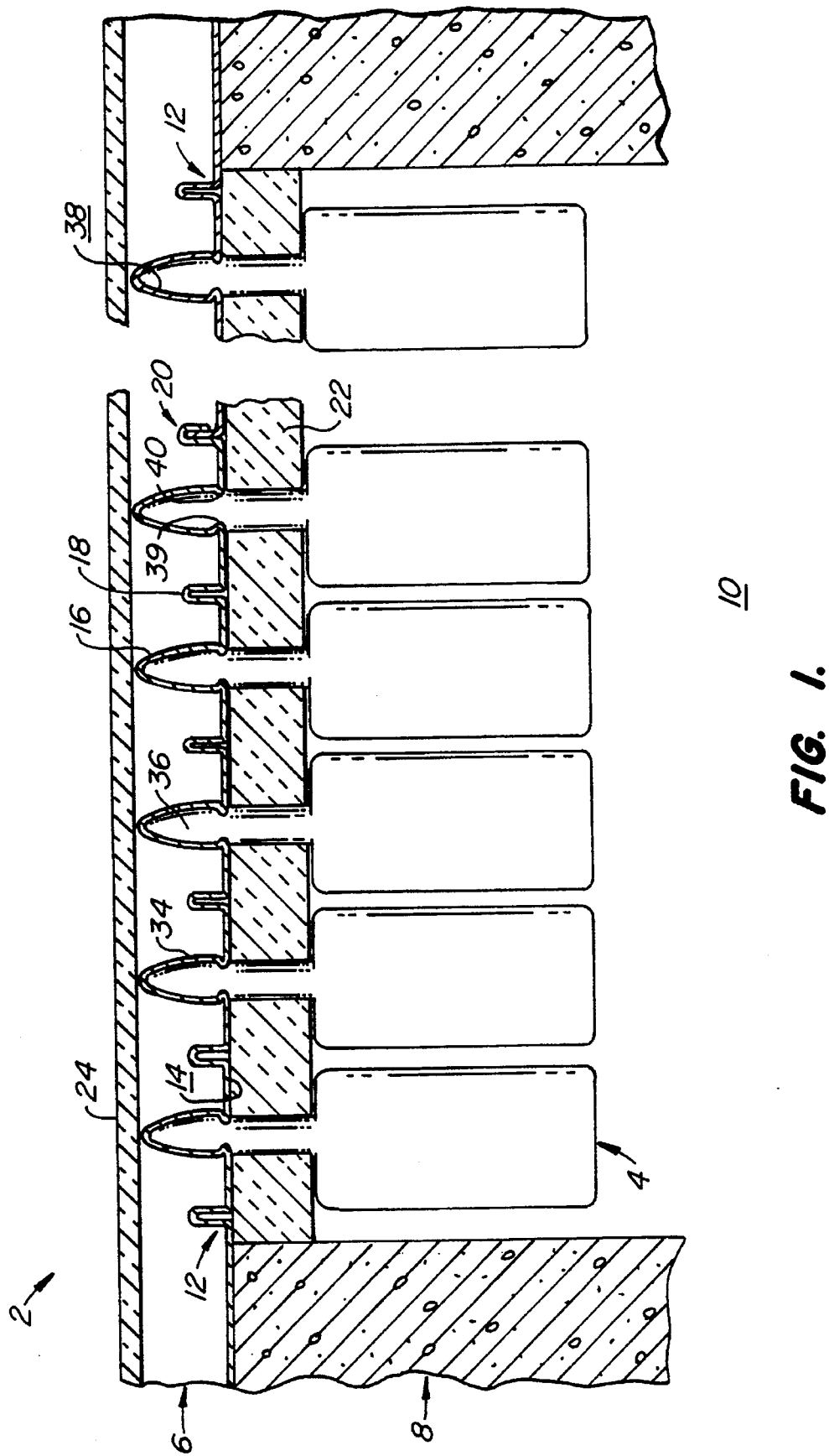
FIG. 1 is a cross-sectional view of a temperature regulating system according to the principles of the present invention.

Referring to the drawings in detail, wherein like numerals indicate like elements, a temperature regulating system 2 is illustrated according to the principles of the present invention. Temperature regulating system 2 generally includes a plurality of temperature regulators or containers 4 attached to the inside surface of a roof 6 of a structure 8, such as a storage shed, for passively cooling the interior 10 of the structure. It should be understood, however, that although temperature regulating system 2 is shown and described as part of the roof of a particular structure 8, it is not intended to be limited in that manner. That is, system 2 can be used as part of the exterior wall of a wide variety of different structures, such as residential houses, office buildings, remote storage rooms, etc.

As illustrated in FIG. 1, temperature regulating system 2 preferably includes a number of wall sections 12 that are linked together to form roof 6 of structure 8. Each wall section 12 has an inner surface 14 with a plurality of generally parallel corrugations 16 formed therein. Wall sections 8 are constructed of a highly thermally conductive material, such as aluminum or steel, to facilitate heat transfer through roof 6. In a preferred configuration, wall sections 12 further include a plurality of smaller furrows 18 formed between channels 16. Each wall section 12 ends in the middle of one of the furrows 18 to form a linkage 20. Adjacent walls sections 12 are coupled together by attaching two linkages 20 together, as is conventional in the art. This configuration allows wall sections 12 to be manufactured quickly and inexpensively by roll forming corrugations 16 and furrows 18 with conventional machining processes. In addition, the modular wall sections 12 provide a flexible arrangement so that temperature regulating system 2 can be individually tailored for a particular roof or exterior wall of a building.

As shown in FIG. 1, containers 4 are aligned in corrugations 16 so that there is a space, preferably about ½ inch, between each container 4. This provides room for the containers to expand and also facilitates convective air flow about the outer surfaces of the containers. Of course, one skilled in the art will readily recognize that the invention is not limited to the above configuration. For example, wall sections 12 could be manufactured with only linkages 20 at each end, instead of having furrows 18 between each corrugation 16. Alternatively, wall sections 12 can be coupled together by other means or roof 6 can simply be formed in one piece.

In the preferred embodiment of FIG. 1, temperature regulating system 2 further includes insulation 22 adjacent inner surface 14 of roof 6 to enhance the insulation of interior 10. Insulation 22 is sized to fit between adjacent containers 4, as is shown in FIG. 1, and may also be inserted through holes in containers 4 (discussed in more detail below).

Figure 2:
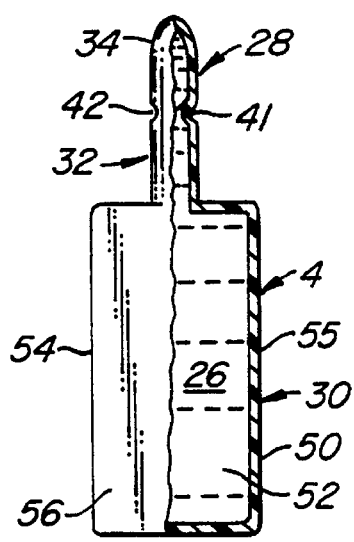
FIG. 2 is an end cross-sectional view of one temperature regulator or container of the temperature regulating system of FIG. 1.
Figure 3:
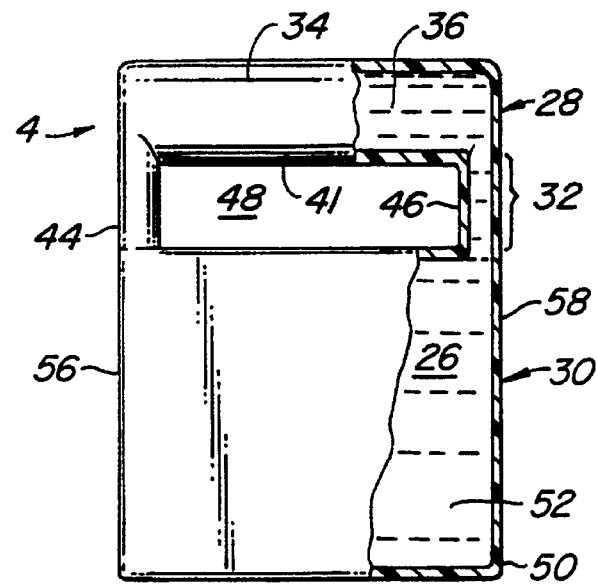
FIG. 3 is a side cross-sectional view of the container of FIG. 2.
Figure 4:
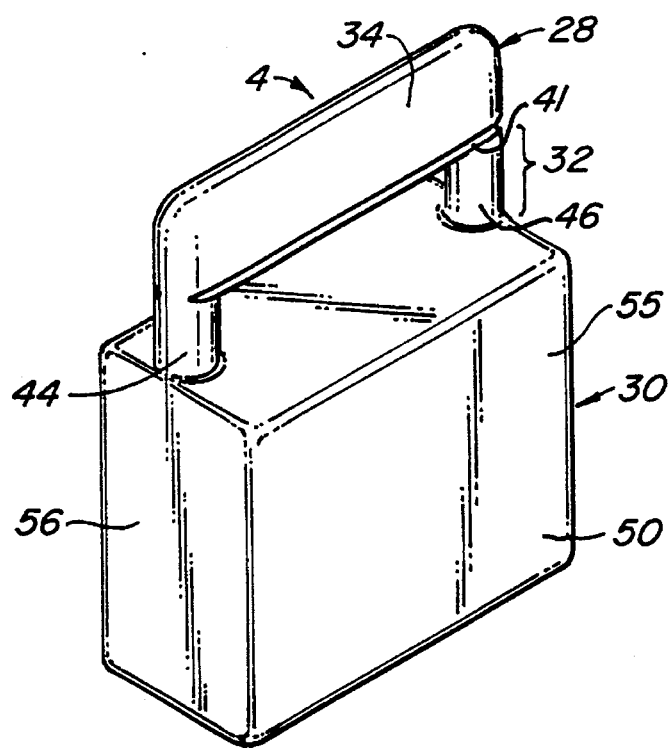
FIG. 4 is a perspective view of the container of FIG. 2.

As shown in FIGS. 2–4, containers 4 include a generally rectangular body portion 30 with an elongated heat exchanger portion 28 attached to body 30 by a neck 32 that preferably includes first and second tubes 44, 46. Containers 4 are constructed using a material with a relatively low thermal conductivity, such as plastic. Preferably, the wall thickness of containers 4 is about 0.02 to 0.07 inches. Containers 4 are generally constructed by blow molding, as is conventional in the art. Of course, the invention is not limited to this method of manufacture and containers 4 can be formed by injection molding, rotational molding or other conventional techniques.

Heat exchanger portion 28 has an outer wall 34 defining an inner chamber 36 with a cross-sectional area of about 0.5 to 1.0 in$^2$ for housing some of the water 26 within container 4. As shown in FIG. 1, outer wall 34 has a generally convex outer surface that conforms to a concave inner surface 38 of corrugation 16. This ensures that heat exchanger portion 28 will be in intimate contact with wall section 12 so that heat can be transferred between chamber 36 and the ambient environment above roof 6 (or the exterior wall, as discussed below). To facilitate this heat exchange, inner surface 38 of corrugation 16 preferably has a shape that maximizes the surface area between outer wall 34 of heat exchanger portion 28 and corrugation 16, such as the preferred "U" cross-sectional shape shown in FIG. 2. Inner surface 38 includes opposing protrusions 39, 40 and outer wall 34 of heat exchanger portion 28 has grooves 41, 42 that mate with protrusions 39, 40 so that wall section 12 can hold the weight of container 4 and water 26. Containers 4 are snap-fit into wall section 12 by inserting each heat exchanger portion 28 into one of the corrugations 16 until grooves 41, 42 are aligned with protrusions 39, 40.

Containers 4 house a liquid, such as water 26, which absorbs and transfers heat from the system (described below). Water 26 may also serve to reduce fire hazards in the structure. In the preferred embodiment, the liquid in containers 4 is substantially pure water (no other substances are purposely added). However, when temperature regulating system 2 is used as a heater, the liquid preferably comprises a mixture of water and salt or anti-freeze, as discussed below. To adequately support containers 4 and water 26, corrugations 16 will be relatively deep compared to conventional corrugated roof or wall panels. Preferably, corrugations 16 will be between about 1–2 inches deep. Manufacturing deep corrugations 16 has the additional advantage of providing an extremely large surface area for heat transfer between heat exchanger portions 28 of containers 4 and the corrugations.

As shown in FIGS. 3 and 4, container has a hole 48 to form tubes 44, 46, which have a substantially smaller cross-sectional area than heat exchanger portion 28 or body 30 to decrease the rate of heat exchange between these two portions of container 4 (in the absence of convection). In this manner, only a small portion of heat from heat exchanger portion 28 will pass into body 30 during the day, thereby facilitating the insulation of interior 10 of structure 8. It should be noted that neck 32 may extend along the entire length of heat exchanger portion 28, rather than comprising two tubes 44, 46 that are spaced apart from each other. With this configuration, neck 32 may, for example, have inner walls that form a plurality of vertical passages between body 30 and heat exchanger portion 28. Alternatively, a sheet of flat plastic may be disposed between tubes 44, 46.

Body 30 comprises an outer wall 50 defining a chamber 52 with a volume that is substantially larger than the volume of heat exchanger portion 28 so that most of the water in container 4 is housed in body 30. Outer wall 50 comprises opposing sidewalls 54, 55 and opposing endwalls 56, 58 that are preferably shorter than the sidewalls so that body 30 has a generally rectangular shape, as shown in FIG. 4. Of course, body 30 may have other conventional shapes, e.g., square, spherical, etc. The water 26 in body 30 serves to shield interior 10 of structure 8 from heat during the day (note that body 30 may also be used to insulate interior 10 from cold, as discussed below). In a preferred configuration, outer wall 50 has a relatively large radius of curvature, e.g., about 6 to 10 inches, so that wall 50 is generally flat. This increases the flexibility of outer wall 50 of the body so that it will expand when the water within container 4 freezes. Outer wall 50 will then contract when water 26 melts again so that body 30 may withstand many freeze-thaw cycles. Alternatively, sidewalls 54, 55 may include large shallow indentations or dimples (not shown) that, during the change in volume during freezing, change from a negative to a positive curvature.

After container 4 undergoes a number of freeze-thaw cycles, the bottom portion of body 30 will tend to bulge out slightly because the plastic outer wall 50 will not completely conform to its original shape. When this occurs, a negative pressure will be applied to the inner surface of heat exchanger portion 28. This negative pressure will tend to either draw water 26 downwards toward the now larger volume body 28 or collapse outer wall 34 of heat exchanger portion 28 so that the total volume of container 4 remains the same. Both of these outcomes, however, could reduce the efficiency of temperature regulating system 2 because the fluid in heat exchanger portion 28 would be drawn away from roof 6.

To effectively prevent the water in heat exchanger portion 28 from flowing down into body 30, container 4 is preferably airtight and essentially filled with water 26. To inhibit the collapse of outer wall 34, outer wall 34 is preferably constructed with a positive radius of curvature, as shown in FIG. 4. A positive radius of curvature makes outer wall 34 more resistant to applied forces, such as the inward vacuum pressure caused by the outward bulging of the lower portion of body 30. Preferably, outer wall 34 has a radius of curvature sufficient to resist a negative pressure equal to the height of container 4 or about 5 to 15 inches. This effectively ensures that outer wall 34 will remain in intimate contact with inner surface 14 of wall section 12 throughout a number of freeze-thaw cycles.

Referring again to FIG. 1, the temperature regulating system operates by disposing heat during the night, slowly warming during the day, and then cooling again after sundown. During the day, when roof 6 is heated by solar radiation, insulation 22 and the water 26 within body 30 of each container 4 provide a substantial barrier to the transfer of heat into the structure. In addition, the heat produced from equipment, people or animals within the interior of structure will be absorbed by the water within body 30. At night, the radiation of heat from the roof 6 into the night sky cools the water within each heat exchanger portion 28 so that it becomes cooler than the water in the body 30. Since warmer water tends to rise, the warmer water will circulate upwardly through tubes 44, 46 so that the entire water mass is cooled by a combination of convection and radiation to the night sky. A complete description of this heat transfer process is described in commonly assigned U.S. Pat. No. 5,070,933 to Baer.

Figure 5A:
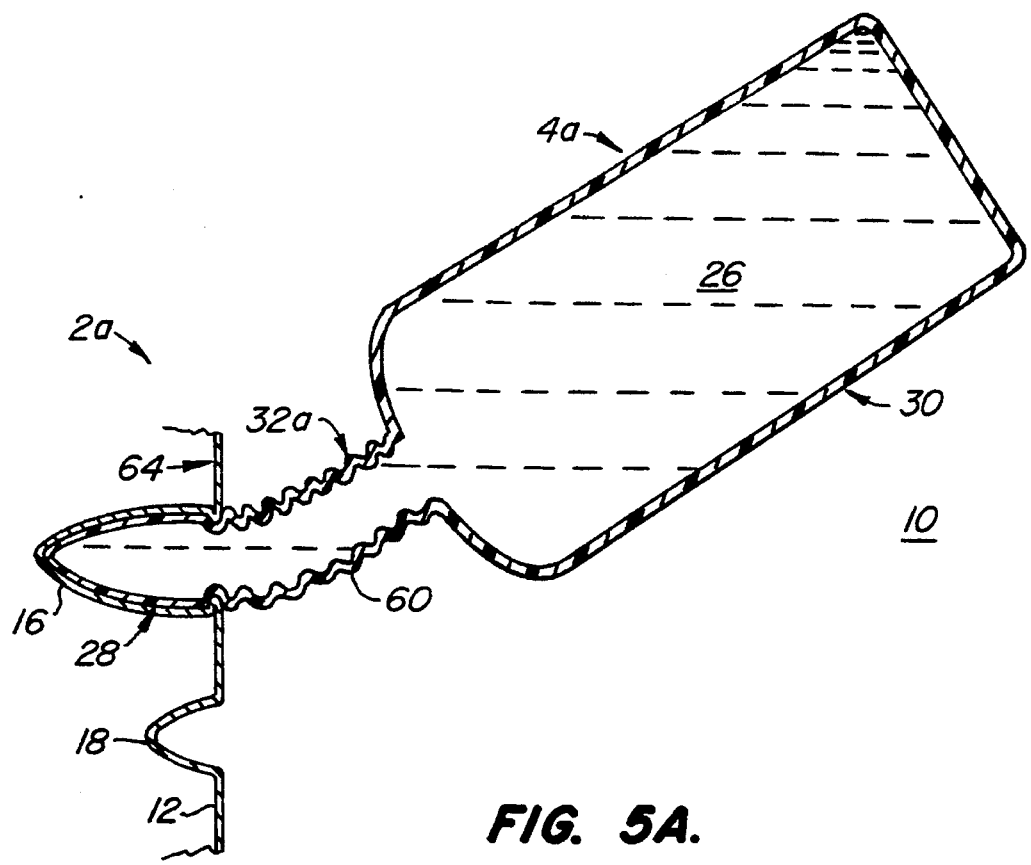
FIG. 5A is a sectional view of an alternative embodiment of the container of FIG. 2 incorporating a flexible neck and illustrated in a heating mode.
Figure 5B:
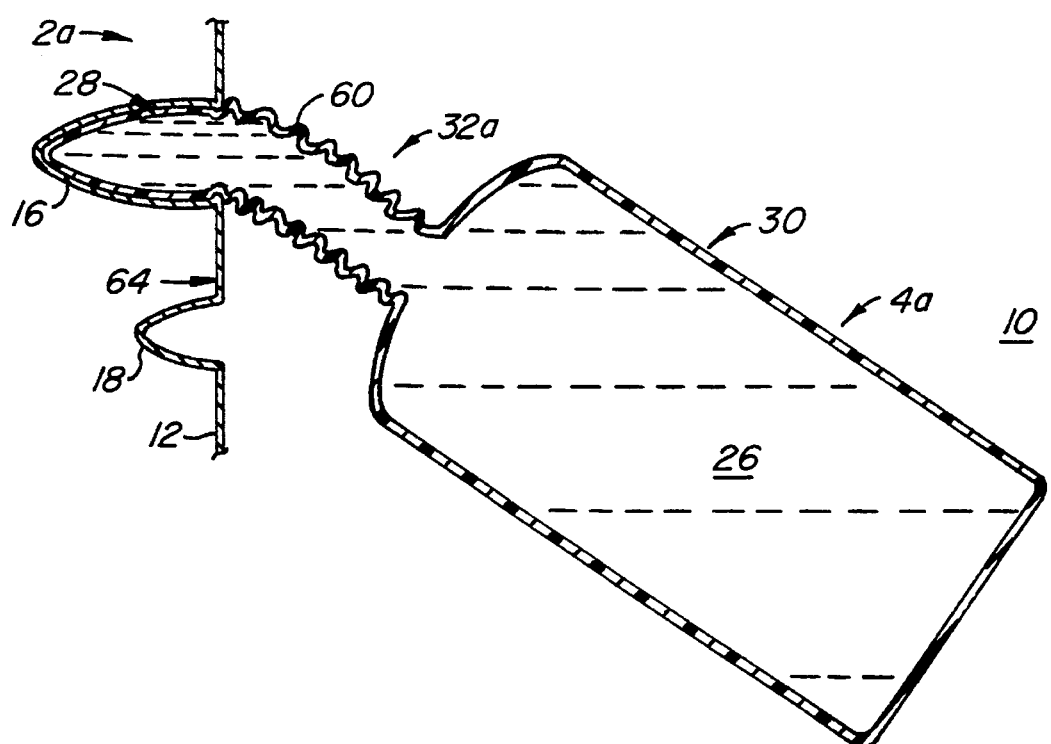
FIG. 5B is a sectional view of the container of FIG. 5A in a cooling mode.

FIGS. 5A and 5B illustrate an alternative embodiment of temperature regulating system 2, in which containers 4a are attached to exterior sidewalls 64 of structure. In this embodiment, wall sections 12 form a portion of the exterior sidewalls 64 of structure 8. A sheet 24 of material, such as glass or plastic, preferably covers the outer surface of the sidewalls 64 to protect wall sections 12. Sheet 24 can be coupled to the sidewalls of structure 8 in any conventional manner (not shown). Preferably, wall sections 12 are arranged so that corrugations 16 and furrows 18 extend generally parallel to the ground and containers 4 extend horizontally away from wall sections 12. However, since builders generally fabricate outer walls with the corrugations extending vertically, containers 4a may be designed to fit within vertical corrugations.

Preferably, containers 4a can be manipulated to either passively cool or passively heat the interior of structure 8. In this configuration, tubes 44, 46 of container 4a are preferably flexible bellows 60 (only one bellow is shown in the figures) so that heat exchanger portion 28 and body 30 can be moved with respect to each other. To cool interior 10, flexible bellows 60 are manipulated so that body 30 is disposed below heat exchanger portion 28, as shown in FIG. 5B. In any case of cooling no plastic or glass sheet 24 is placed outside one wall. Similar to the preferred embodiment, temperature rise within the interior of the structure is minimized by the water in the body of the container during the day. At night, as the night air and sky cools the water in the heat exchanger portion, the heat from the water in body 30 rises into heat exchanger portion 28 so that the entire container is cool by the beginning of the next day.

To heat interior 10, flexible bellows 60 are manipulated so that body 30 is disposed above heat exchanger portion 28, as shown in FIG. 5A. In this mode, heat is absorbed by the water in heat exchanger portion 28 during the day. This heat then rises into body 30 to insulate or heat interior 10 at night. In this embodiment, it is preferable to add salt, anti-freeze or a similar substance to the pure water in containers 4 to prevent the reverse convection that occurs in pure water near 4° C. during the heating mode. This reverse convection could cause the water to lose valuable heat.

Figure 6A:
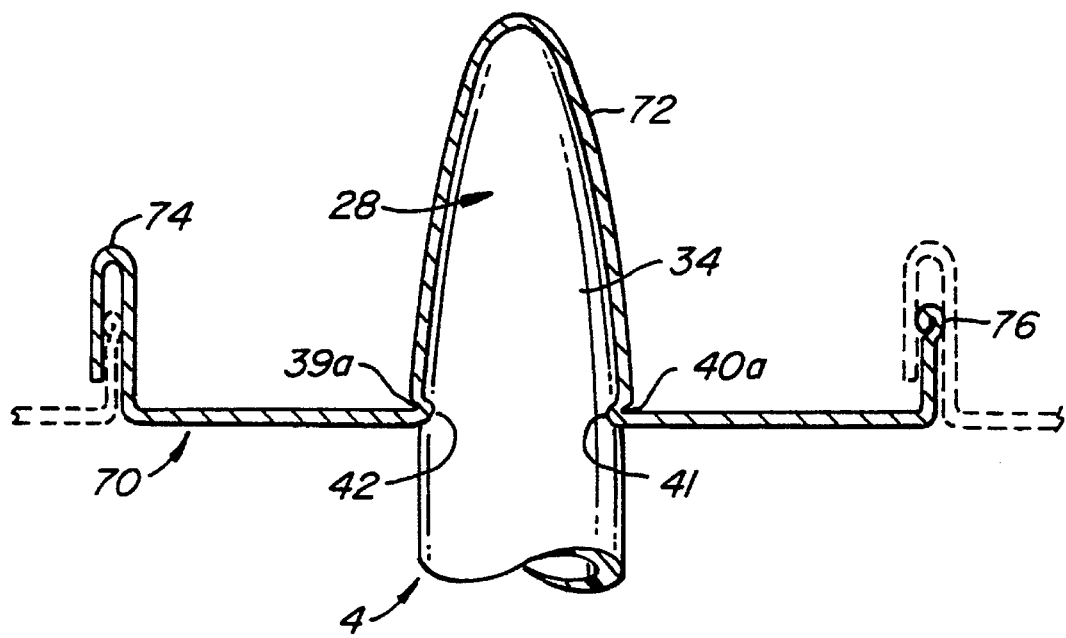
FIG. 6A is a sectional view of an alternative embodiment of the temperature regulator of FIG. 1 in which the container of FIG. 2 is attached to an extruded metal part that forms a portion of the exterior wall of the structure.
Figure 6B:
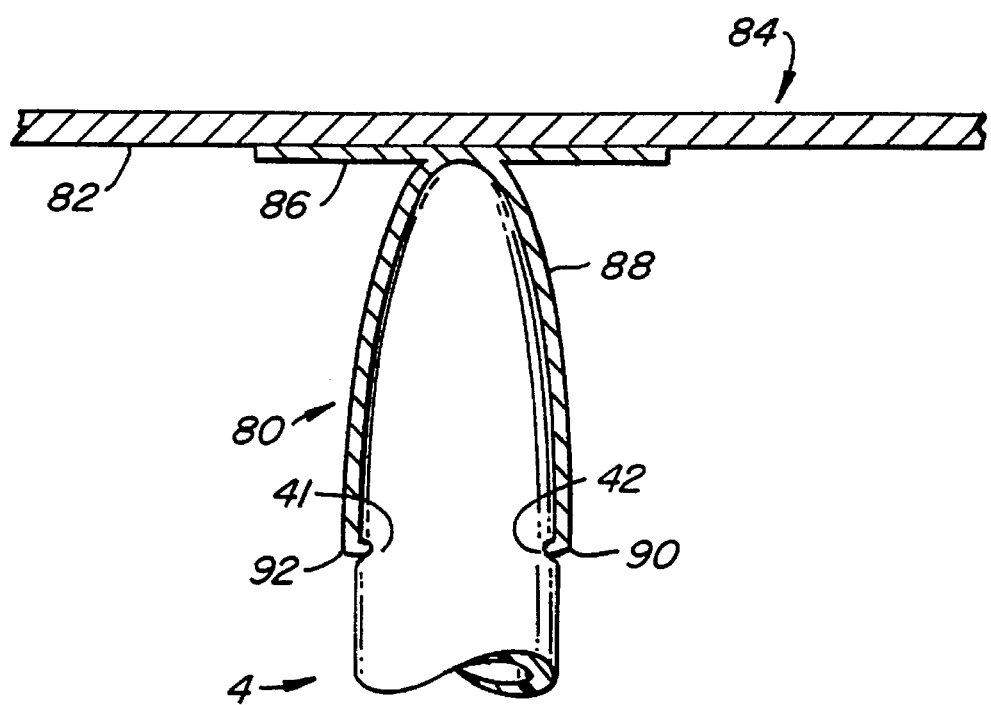
FIG. 6B is a sectional view of another alternative embodiment in which an extruded metal part is coupled to the inner surface of the exterior wall of the structure.

FIGS. 6A and 6B illustrate an alternative embodiment of temperature regulating system 2 in which wall sections 12 are replaced with extruded metal parts. Referring to FIG. 6A, an extruded metal part 70 made of a highly conductive metal, such as aluminum, comprises a channel portion 72 for receiving a plastic container 4. Similar to the preferred embodiment, channel portion 72 includes protrusions 39a, 40a to mate with grooves 41, 42 in outer wall 34 of heat exchanger portion 28 so that part 70 will hold the weight of container 4 and water 26. Metal part 70 further includes a first coupling member 74 on one end and a second coupling member 76 on the other end. As shown by the dotted lines in FIG. 6A, first and second coupling members 74, 76 fit together so that a plurality of metal parts 70 can be attached together to form at least a portion of the exterior wall of structure 8.

FIG. 6B illustrates an extruded metal part 80 that can be attached to the inner surface 82 of the exterior wall 84 of structure 8. Part 80 includes a planar portion 86 that can be conventionally coupled to inner surface 82, e.g., spot welding or riveting, and a channel portion 88 for receiving plastic container 4. Channel portion 88 has two ends 90, 92 that curve inward to mate with grooves 41, 42 in container 4. This embodiment is advantageous because metal parts 80 can be attached to the walls or roof of a structure that has already been built. In addition, the temperature regulating system can be custom built by mounting metal parts 80 in a particular spacing arrangement around the structure.

Other modifications and variations can be made to disclose embodiments without departing from the subject invention as defined in the following claims. For example, tubes 44, 46 are not limited to flexible bellows 60 when containers 4a are attached to the sidewalls 64 of the structure. Instead, tubes 44, 46 may be rigid and oriented diagonally so that each body 30 of the containers is permanently mounted either above or below heat exchanger portion 28. In this configuration, when the user desires to switch from the cooling mode to the heating mode (or vice versa), containers 4a can be withdrawn from sidewalls 64, turned upside down, and then re-inserted into the corrugations in the sidewalls. This configuration may be more sturdy than the flexible bellows and it avoids the necessity of building supporting racks, which may be required with the flexible bellows to prevent the containers from inadvertently falling down below the heat exchanger portion due to the flexibility of the bellows.

What is claimed is:

1. A system for regulating a temperature of an interior of a structure comprising:

a thermally conductive element adapted to form part of an exterior wall of the structure, the thermally conductive element having at least one corrugation with a concave surface facing inwardly from the exterior wall;

at least one container comprising a body portion and a heat exchanger portion extending from the body portion and including a conduit, the heat exchanger portion being in liquid communication with the body portion at each end of the conduit and being attached to the thermally conductive element within the corrugation; and a supply of liquid within the container, whereby the liquid in the conduit of the heat exchanger portion exchanges heat with an ambient environment through the thermally conductive element and the liquid in the body portion modifies the temperature of the interior of the structure.

2. The temperature regulator of claim 1 further including a neck coupling the heat exchanger portion to the body portion, the neck including first and second tubes spaced apart from each other for fluidly coupling the conduit to the body portion.

3. The temperature regulator of claim 1 wherein the container is airtight and essentially filled with the liquid.

4. The temperature regulator of claim 1 wherein the body and heat exchanger portions each have outer walls, the outer wall of the body portion having a larger radius of curvature than the outer wall of the heat exchanger portion.

5. The temperature regulator of claim 4 wherein the outer wall of the body portion has opposing sidewalls each having a dimple to facilitate expansion and contraction of the sidewalls.

6. The temperature regulator of claim 4 wherein the outer wall of the heat exchanger portion has a radius of curvature of about 2 to 4 inches.

7. The temperature regulator of claim 4 wherein the concave surface of the corrugation includes opposing notches and the outer wall of the heat exchanger portion includes grooves that mate with the notches so that the thermally conductive element supports a weight of the container and the liquid disposed therein.

8. The temperature regulator of claim 1 wherein the thermally conductive element is a roll formed wall section that forms a portion of the exterior wall of the structure.

9. The temperature regulator of claim 1 wherein the thermally conductive element is an extruded metal part having a planar portion coupled to an inner side of the exterior wall of the structure, the corrugation extending from the planar portion opposite the exterior wall.

10. The temperature regulator of claim 2 wherein the thermally conductive element is a portion of a roof of the structure and the container extends downward from an inner side of the roof, whereby heat is radiated from the liquid in the heat exchanger portion through the roof into the night sky, and heat transfer to the interior of the structure is minimized during the day by the liquid in the body portion.

11. The temperature regulator of claim 10 wherein the thermally conductive element is a portion of an exterior sidewall of the structure and the first and second tubes of the neck of the container are flexible bellows movable between a first position, where the tubes are inclined at a downward angle such that the body portion is disposed below the heat exchanger portion, and a second position, where the tubes are inclined at an upward angle such that the body portion is disposed above the heat exchanger portion.

12. The temperature regulator of claim 11 wherein the container operates as a heater when the tubes are in the second position, whereby heat is absorbed by the liquid in the heat exchanger portion during the day, the heat rising into the body portion to insulate the interior of the structure during the night.

13. The temperature regulator of claim 11 wherein the container operates as a cooler when the tubes are in the first position, whereby heat is radiated from the liquid in the heat exchanger portion through the roof into the night sky, and heat transfer to the interior of the structure is minimized during the day by the liquid in the body portion.

14. The temperature regulator of claim 4 wherein a cross-section of the corrugation and the outer wall of the heat exchanger portion are generally U-shaped to provide a relatively large surface area for transferring heat between the ambient environment and the liquid within the heat exchanger portion.

15. The temperature regulator of claim 1 wherein the liquid is water.

16. The temperature regulator of claim 1 wherein the liquid comprises water and another substance selected from the group consisting essentially of salt and anti-freeze.

17. A passively cooled structure comprising:

an enclosure including a wall having an interior surface that defines a portion of an outer boundary of an interior space, the interior surface having a plurality of corrugations each having a concave surface facing inward from the wall; and a plurality of temperature regulators coupled to the interior surface of the wall, each temperature regulator comprising:

a container comprising a body portion, a thermally conducting element and a heat exchanger portion extending from the body portion and including a conduit, the heat exchanger portion being in liquid communication with the body portion at each end of the conduit and being attached to the thermally conductive element within the corrugation; and a supply of liquid within the container, whereby the liquid in the conduit of the heat exchanger portion exchanges heat with an ambient environment through the wall and the liquid in the body portion modifies a temperature of the interior space of the structure.

18. The structure of claim 17 further including insulation located adjacent the interior surface of the wall between the containers.

19. The structure of claim 17 wherein the wall is a portion of a roof of the structure and each container extends downward from a inner side of the roof, whereby heat is radiated from the liquid in the heat exchanger portion of each container through the roof into the night sky, and heat transfer to the interior space is minimized during the day by the liquid in the body portion of each containers.

20. The structure of claim 17 wherein the structure comprises a roof and a plurality of sidewalls, the wall being a portion of one of the sidewalls of the structure and each container includes means for moving the body portion between a first position above the heat exchanger portion and a second position below the heat exchanger portion.

21. The structure of claim 20 wherein each container operates as a cooler when the body portion is in the second position, whereby heat is radiated from the liquid in the heat exchanger portion of each container through said one of the sidewalls into the night sky, and heat transfer to the interior of the structure is minimized during the day by the liquid in the body portion of each container.

22. The structure of claim 20 wherein each container operates as a heater when the body portion is in the first position, whereby heat is absorbed by the liquid in the heat exchanger portion of each container during the day, the heat rising into the body portion of each container to insulate the interior of the structure during the night.

* * * * *